April 2, 1968
C. G. ABBOT
3,376,165
APPARATUS FOR CONVERTING SOLAR ENERGY TO ELECTRICITY
Filed Oct. 22, 1965
2 Sheets-Sheet 1
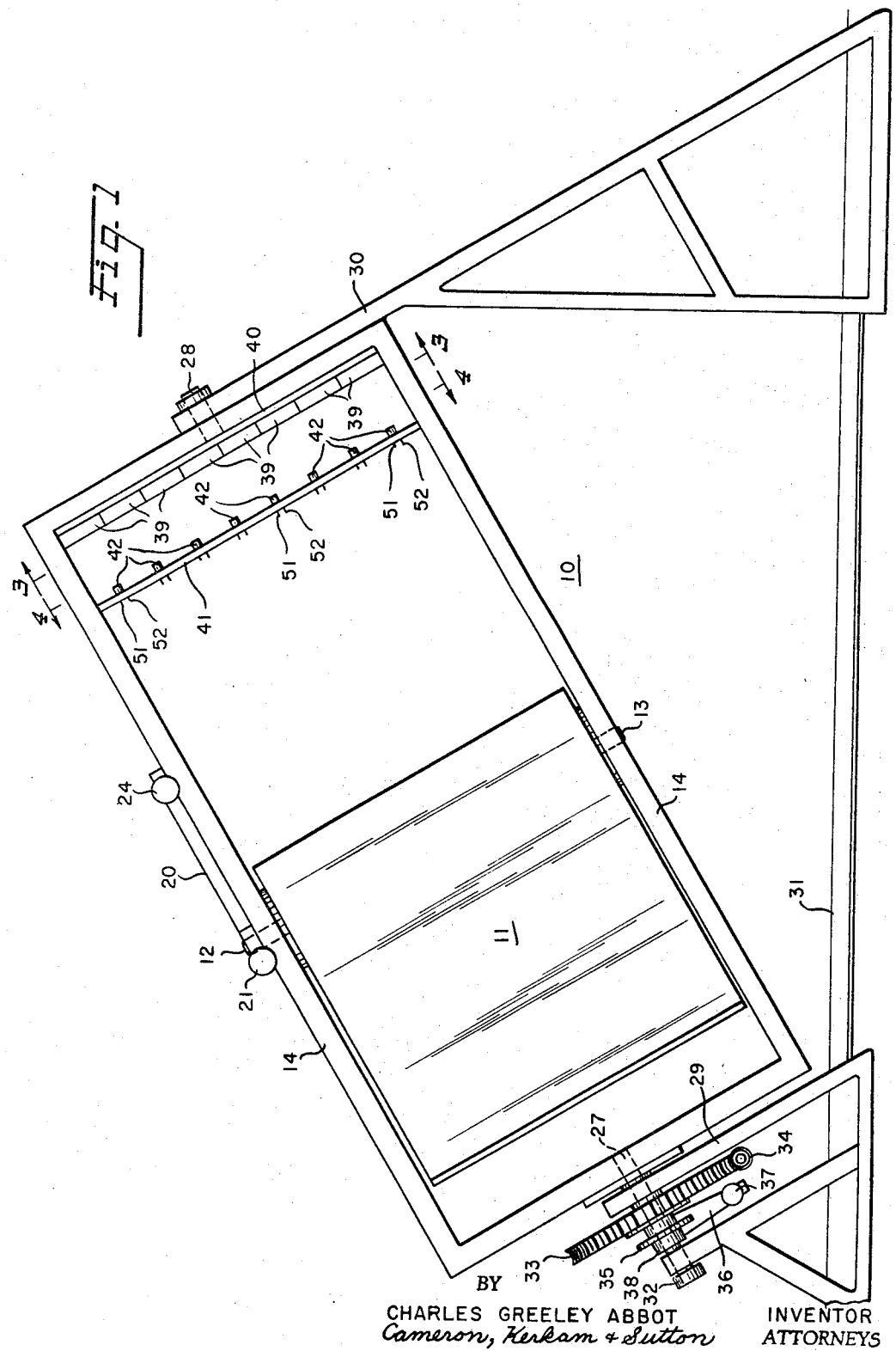
INVENTOR
CHARLES GREELEY ABBOT
BY Cameron, Kerkam & Sutton
ATTORNEYS

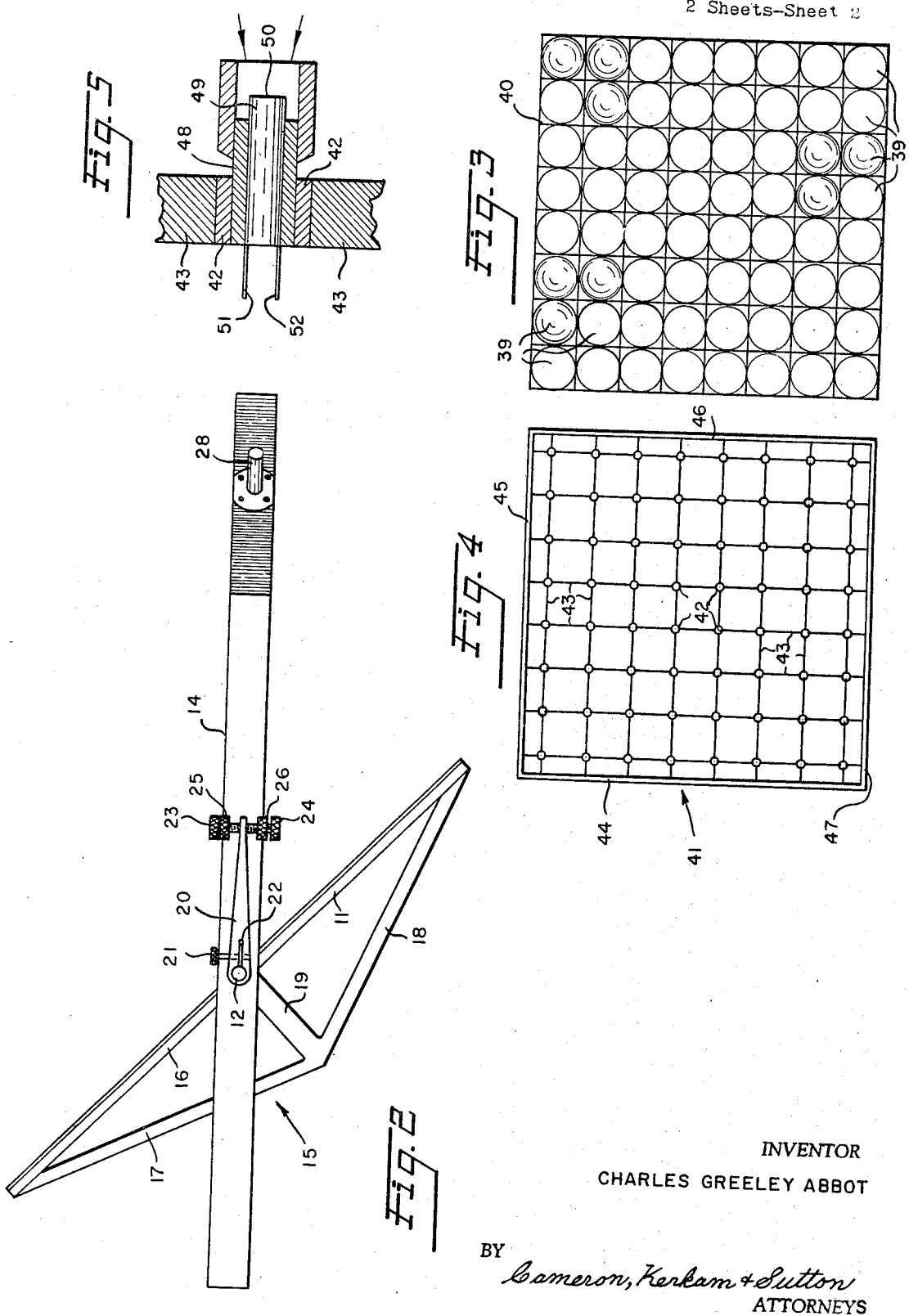

3,376,165
APPARATUS FOR CONVERTING SOLAR ENERGY TO ELECTRICITY
Charles G. Abbot, 4409 Beechwood Road,
Hyattsville, Md. 26782
Filed Oct. 22, 1965, Ser. No. 501,946
14 Claims. (Cl. 136—89)

The present invention relates generally to apparatus for harnessing solar radiation and more particularly to apparatus of the type for converting solar energy to electrical energy in an economical and efficient manner.

Because of the unlimited quantity of available energy of solar radiation, the idea of converting solar radiation to electrical energy is one that has occupied men's minds for years and many attempts have been made to harness solar radiation for commercial power generation. However, because the energy of solar radiation is so diffuse, proposed arrangements for converting solar energy to electrical energy have hitherto been inefficient and impractical due to the large apparatus required and the attendant high cost, particularly with regard to the cost of accurately figured large optical surfaces and supporting apparatus used to focus the Sun's rays.

Accordingly, the primary object of the present invention is to provide an improved apparatus for converting solar energy to electrical energy.

Another object of the present invention is to provide an improved solar-to-electrical energy converter characterized by low cost of production, operation and maintenance.

Another object of the present invention is to provide an improved solar-to-electrical energy converter for producing large amounts of power from that inexhaustable free source, solar radiation.

Another object of the present invention is to provide an improved solar-to-electrical energy converter which through magnification of the intensity of solar energy provides an efficient and economical means for harnessing solar energy for commercial power generation.

Other objects and attendant advantages of the present invention will be apparent from the description thereof taken in connection with the accompanying drawings. The invention is capable of a variety of mechanical expressions, only one of which is illustrated in the accompanying drawings. Therefore, it is to be expressly understood that the drawings are for the purpose of illustration only and are not intended to represent the full scope of the invention which is defined by the appended claims.

In accordance with the present invention, there is provided a reflecting surface supported by suitable means for maintaining the reflecting surface oriented so as to provide a reflected beam of solar rays parallel to the Earth's polar axis. The reflected beam is subdivided into parallel beams by an array of optical devices each of which directs a beam to a common focal plane at which is supported an array of primary radiation sensitive elements which convert the solar energy of the individual beams to electrical energy. The total energy produced is a function of the size of the array and can be multiplied by combining the output of a plurality of solar energy converters.

In one form of the present invention, the reflecting surface comprises a plane rectangular surface which reflects a fixed solar beam of square cross-section onto an array of mirrors. The array of optical devices is formed from a plurality of short focus, concave mirrors disposed with their axes parallel to the polar axis of the Earth. The concave mirrors cover in area the entire cross-section of the fixed solar beam, and each mirror reflects a converging cone of rays to a common focal plane at which is supported at right angles to the Earth's polar axis a spider frame. The spider frame supports an array of primary radiation sensitive elements in a manner such that each element receives one of the focused converging cones and the output of each element is serially connected to provide an output from the array of elements which is the sum of the outputs of the individual elements.

To obtain increased amounts of electrical energy, it is only necessary to provide a plurality of the above-described individual solar energy converting units and locate the units so that they will not shade each other. Advantageously, in such an arrangement, the units are located in a north-south row not over 20 feet apart with the output of the individual units additively connected by electrical conductors. Also, more than one such north-south row can be provided in which case each north-south row is separated in the east-west direction by a moderate distance.

In the accompanying drawings, wherein like characters designate corresponding parts throughout the several figures:

FIG. 1 is a side elevational view of the present invention as viewed from the east;

FIG. 2 is a partial plan view of the present invention with the siderostat adjuncts removed for simplicity to illustrate how the frame can be fixed and adjusted to follow the declination of the Sun and reflect a strong solar beam of square cross-section parallel to the polar axis;

FIG. 3 is a view taken along lines 3—3 of FIG. 1 showing the array of concave mirrors;

FIG. 4 is a view taken along lines 4—4 of FIG. 1 showing the spider frame; and

FIG. 5 is a detail view, partially in cross-section, of a primary radiation sensitive element forming one point of the solar energy converting array.

Referring to the accompanying drawings, and in particular to FIG. 1, reference numeral 10 generally indicates a siderostat which supports a plane reflecting surface 11 for rotation about an axis parallel to the axis of the Earth. Reflecting surface 11 therefore lies in a north-south direction and is further pivotally mounted by trunnions 12 and 13 supported in a closed frame 14.

In this manner, the reflecting surface 11 maintains a reflected beam in a constant, fixed direction for all movements of the Sun for any daylight hour throughout the year. Such arrangements for following the Sun's diurnal path are well known.

A polar siderostat is a device familiar to astronomers and is frequently used to counteract the daily apparent motion of heavenly bodies to reflect the rays of a body observed in a constant direction. By infrequent slight adjustments, the polar siderostat maintains the fixed direction of a reflected beam constant for all daily apparent movements of the body. Accordingly, the polar sidesostat and its associated driving means will not be described in detail and reference may be had to my prior U.S. Patents 2,247,830, 2,460,482 or 2,906,257 for a fuller description thereof.

While within certain aspects of this invention the reflecting surface 11 may be of any suitable construction, advantageously the reflecting surface is in the form of a flat plane mirror. The mirror may be constructed of plate glass, silver plated on the rear, or it may be formed from a plurality of sheets of metal in which case the reflecting surface of the sheets is made highly reflective by a suitable coating material such as, for example, a film of rhodium or by being composed of any suitably high reflective material such as, for example, an aluminum alloy or preparations such as "Alumilite."

The mirror 11 is supported in any suitable manner so as to incline its axis in a north-south direction, and appropriate means such as are known to those skilled in the art are used for adjusting the mirror to conform with the declination of the Sun as it varies from day to day in its north-south march. To this end, as shown in FIGS. 1 and 2, the mirror 11 is carried by frame 15 comprising a mirror support 16 and struts 17, 18 and 19. Frame 15 is pivotally supported to frame 14 by trunnions 12 and 13. The means for adjusting the mirror 11 on trunnions 12 and 13 may be of any suitable construction such as commonly used in astronomical instruments.

As more clearly shown in FIG. 2, an arm 20 is affixed to trunnion 12 and carries at one end a screw 21 for clamping the arm to the trunnion in any suitable manner such as, for example, by means of an expansion slot 22. The other end of arm 20 extends between a pair of adjusting screws 23 and 24 cooperatively associated with nuts 25 and 26, respectively mounted on frame 14. A rough adjustment of the location of the mirror 11 may be effected by first loosening the screw 21 and approximately positioning the axis of the mirror 11 after which the screw 21 may be tightened. Accurate adjustment thereafter may be effected through manipulation of the screws 23 and 24. Thus, the axis of the mirror 11 may be adjusted daily in a north-south direction to conform with the position of the Sun and its annual march.

Frame 14 is provided with a pair of trunnions 27 and 28 in a plane at right angles to the trunnions 12 and 13. Trunnions 27 and 28 are fixed at opposite ends of the open frame 14 and are mounted by means of any suitable bearings in supports 29 and 30 carried by suitable framework 31. Trunnion 27 presses against a thrust bearing 32 and is operatively connected to conventional driving means for rotating the frame 14 around the axis of the trunnions 27 and 28 to cause the mirror 11 to move through an angle of 15° per hour in following the diurnal movement of the Sun. For simplicity, the driving means have not been shown in detail, but is represented by the worm wheel 33 and worm screw 34 driven by an electric motor (not shown), and may take the form of a driving means such as disclosed, for example, in my prior U.S. Patents Nos. 2,141,330, 2,205,378 or 2,906,257. Angularity of the mirror 11 with respect to the Sun is thus made by means of handwheel 35 operatively connected to the worm wheel 33 through arm 36, adjusting screw mechanism 37 and split sleeve 38 so that when the split sleeve is clamped, the worm wheel 33 will rotate the frame 14 to follow the Sun's daily course.

Disposed at the north end and fixed upon the inside of the upper end of the rectangular open frame 14 in a plane normal to the polar axis of the Earth so as to be in the path of the solar rays reflected from the mirror 11 is an array of optical devices arranged to provide a light directing surface and which may be formed by a plurality of small, square, short-focus concave mirrors 39. Closely juxtaposed, these concave mirrors form an array which advantageously covers an area equal to the entire cross-section of the reflected solar beam. Each concave mirror reflects a converging cone of rays toward a common focal plane.

It should be apparent that other forms of light directing surfaces may be utilized. For example, the array may comprise a plurality of lenses for directing the rays to a common focal plane. Although such an arrangement is well suited for use in the present inventions, for practical reasons, mirrors are preferable. Lens surfaces waste radiation by multiple reflections and are accessible to the elements. In addition, lenses have two surfaces to figure while mirrors have only one.

As more clearly shown in FIG. 3, the short focus concave mirrors may be fixed in any suitable manner to a flat frame member 40 rigidly supported at the north or upper end of the frame 14. The solar rays reflected from the mirror 11 form a parallel beam which is subdivided into parallel converging cones, the focus point of each being in the same focal plane so as to define an array of focal points. Advantageously, the short focus concave mirrors are square to conserve the entire reflected solar beam. In the illustrative embodiment of FIGURE 3, the short focus concave mirrors are shown in circular form for clarity; however, it should be apparent that in such an arrangement a portion of the reflected beam is lost so that the use of square mirrors provides the optimum arrangement.

At the focal plane, a spider frame 41 is supported to the side members of the open rectangular frame 14 and at right angles to the earth's axis. As shown in FIG. 4 spider frame 41 supports a plurality of tubular holders or sockets 42 equal in number of the number of concave mirrors 39. Each socket 42 is advantageously formed by a hollow cylindrical member and rigidly connected by thin metal tapes or wires 43 which are attached at their outer extremities to side members 44–47 which make up the spider frame 41. As hereinbefore described the spider frame 41 is disposed in the focal plane of the converging rays so that the individual focus points of the concave mirrors 39 all fall within a corresponding tubular holder. In this manner, the spider frame 41 presents very little shade effect to the reflected solar beam which passes upward through the spider frame from the reflecting surface 11.

Referring to FIG. 5, within each tubular support is mounted a primary radiation sensitive element 48 which converts the solar energy to electrical energy. Each radiation sensitive element may comprise, for example, a thermal-electric junction, a semiconductive element or a photo-voltaic cell.

In accordance with one embodiment of the present invention, the primary radiation sensitive element 48 supported within each tubular holder 42 comprises a highly evacuated capsule 49 of glass or fused quartz. Capsule 49 includes a thin, flat transparent surface 50 disposed in the direction of the reflected cone of rays from the convex mirrors 39. A pair of conductors 51 and 52 is sealed through the walls of each capsule 49. Conductors 51 and 52 are of sufficient length to extend beyond the lower end of the corresponding tubular holder 42 to facilitate connection of the individual elements 48 of the array in a manner such that the contribution or output of each element is added to provide an overall output which is the sum of the outputs of the individual elements. Other combinations are of course possible and depend on the load and amount of power required.

Where the element 48 is a thermal-electric junction, it should be blackened to better absorb the reflected rays and produce a maximum temperature differential across the junction. Several forms of thermal-electric junctions can be effectively utilized and can be selected in accordance with the EMF and temperature relationship of the junction. Nickel-iron junctions are known to have an output of approximately 40 microvolts per °C. Thus, for a junction temperature of 250° C., one capsule yields approximately .01 volt and 256 capsules arranged in a 16 x 16 array would yield approximately 2.5 volts. On the other hand, nickel-tellurium junctions have a rating of 180 microvolts per centigrade degree, and at a junction temperature of 250° C. a 16 x 16 array provides approximately 11.5 volts. Thus, it should be apparent that the total output can be increased not only by selection of the most efficient primary radiation sensitive element, but also by the size of the array and the number of arrays combined.

Other forms of radiation sensitive elements can also be utilized such as, for example, a semiconductive body having a p-n junction. Silicon is well suited for such use and is stable at the temperatures normally to be expected in this use.

In one illustrative embodiment of the present invention, a solar beam of about 4 feet square is reflected up the polar axis from a mirror approximately 4 by 8 feet mounted in an open frame of approximately 4 by 9 feet in dimensions. The fixed solar beam having a cross-section of 4 by 4 feet is separated into 144 conical beams by 144 concave mirrors disposed in a 12 x 12 rectangular array.

Each beam enters the evacuated capsule and is focused on the primary electrical converting element on an area less than ¼ in. sq. such that the magnification of the intensity of the solar energy is greater than 16-fold and sufficient to raise the temperature in the evacuated in capsule several hundred degrees. With an electric element, no more efficient than a nickel-iron thermal-junction, the electro motive force (E.M.F.) generated by one element is greater than 5000 microvolts.

By the present invention, there has been described a novel and efficient solar energy converter which can effectively utilize the solar radiation during all daylight hours of the year to produce electrical energy. On fair days in arid regions, and in particularly high arid regions, a solar beam of 4 x 4 feet is known to contain more than one horsepower of energy. With an arrangement utilizing concave mirrors 3 inches square and a focal length of 10 inches, a temperature rise in the radiation sensitive element of 300° C. can be realized. A fixed reflected sunbeam as large as 10 feet square could feed 1600 concave mirrors in a 10 by 10 foot array. Such a beam in desert mountain plateaus would contain over 10 horsepower before splitting and a large percentage of this energy is easily converted. The utilization of this energy by the present invention provides a particularly advantageous solution to the problem of efficiently powering remotely located, low drain loads which are not accessible to established power stations. Large outputs may be provided by a plurality of converter combinations which can be located in north-south rows with the individual units appropriately joined by electrical conductors, and a plurality of such north-south unit assemblies may be connected in east-west rows separated by moderate distances. Thus, the integrated combinations may be amplified indefinitely, the only limitation being the available space requirement.

Although the invention has been described with reference to only one embodiment thereof, it will be readily apparent, to those skilled in the art that various modifications may be made without departing from the inventive concept. It is therefore intended by the appended claims to cover all such modifications which fall within the true spirit and scope of the invention.

What is claimed is:

1. A solar energy converter adapted to convert solar energy to electrical energy comprising means to cause the maintenance of a solar beam in a fixed direction parallel to the axis of the Earth at any daylight hour including a plane reflecting surface for reflecting the solar beam in the fixed direction, an array of optical elements supported in the path of said reflected solar beam to subdivide the reflected beam into a plurality of focused beams having their foci located in a plane normal to the Earth's axis, and an array of primary radiation sensitive elements disposed in said focal plane, each adapted to receive one of said subdivided beams and convert the solar energy of said beam into electrical energy.

2. A solar energy converter as set forth in claim 1 wherein said array of optical elements comprises a plurality of short focus concave mirrors for subdividing said reflected solar beam into a plurality of focused conical beams forming said foci.

3. A solar energy converter as set forth in claim 1 wherein said array of optical elements comprises a plurality of lenses for subdividing said reflected solar beam into a plurality of focused beams forming said foci.

4. A solar energy converter as set forth in claim 1 wherein said primary radiation sensitive elements each comprises an evacuated capsule having conducting wires sealed through its wall, said elements being serially connected to provide an overall output for said converter which is the sum of the output of the individual elements.

5. A solar energy converter of the type for converting solar radiation into electrical energy comprising means for fixing solar rays in a parallel bundle oriented to an unchanged daily direction, means disposed in the path of said parallel bundle of rays for subdividing said bundle into a plurality of parallel cones of rays converging to a plurality of foci, an equal plurality of transparent, evacuated capsules, each capsule being disposed at a focus point of a parallel cone of rays and including a primary electricity producing element adapted to absorb said rays and convert said rays to electrical energy and conductors sealed in the walls of said capsules and connected for transmitting said electrical energy from said primary elements to a common output position.

6. A solar energy converter as set forth in claim 5 wherein said means for fixing solar rays in a parallel bundle comprises a polar siderostat having a large plane reflecting surface.

7. A solar energy converter as set forth in claim 5 wherein said means for subdividing said bundle comprises a plurality of short-focus concave mirrors closely juxtaposed in a plane at a right angle to the axis of the Earth.

8. A solar energy converter as set forth in claim 5 further including a spider frame, disposed in the path of said parallel bundle of rays and adapted to support said capsules in an array in a manner such as to minimize the shading effect of said spider on said bundle of solar rays passing to the concave mirrors.

9. A solar energy converter as set forth in claim 5 wherein each capsule comprises a quartz body.

10. A solar energy converter as set forth in claim 5 wherein said primary electricity producing elements are thermal-electric junctions.

11. A solar energy converter as set forth in claim 5 wherein said primary electricity producing elements are semiconductive elements having a p-n junction.

12. A solar energy converter as set forth in claim 5 wherein said means for subdividing said bundle comprises a plurality of lenses closely juxtaposed in a plane at a right angle to the axis of the Earth.

13. Apparatus for coverting solar energy to electrical energy comprising a plurality of spaced solar energy converting units arranged in a north-south row, each of said solar energy converting units including a plane reflecting surface arranged to maintain a reflected solar beam in a fixed direction parallel to the axis of the Earth at any daylight hour, optical means comprising an array of light directing elements supported in the path of said reflected solar beam to subdivide the reflected beam into a plurality of focused beams having their foci located in a plane normal to the Earth's axis, an array of primary radiation sensitive elements disposed in said focal plane for providing an electrical output from each element in response to the energy of a subdivided focused beam and means electrically interconnecting said elements to provide an output from a north-south row dependent on the contribution of the individual elements of each converting unit.

14. Apparatus for converting solar energy to electrical energy as set forth in claim 11 further including a plurality of said north-south rows of converting units spaced in an east-west direction and means electrically interconnecting the output of each north-south row to provide an overall output dependent on the contribution of the individual elements of each converting unit.

References Cited

UNITED STATES PATENTS

| | | | |
|---|---|---|---|
| 2,690,463 | 9/1954 | Clevett, Jr. et al. | 136—206 |
| 2,906,257 | 9/1959 | Abbot | 126—271 |
| 2,983,887 | 5/1961 | Wormser | 136—89 X |
| 3,018,313 | 1/1962 | Gattone | 136—89 |
| 3,023,257 | 2/1962 | Fritts | 136—206 |
| 3,118,437 | 1/1964 | Hunt | 126—270 |

ALLEN B. CURTIS, *Primary Examiner.*